United States Patent [19]
Jeoung

[11] Patent Number: 5,828,745
[45] Date of Patent: Oct. 27, 1998

[54] CALL PROCESSING METHOD ADAPTED FOR DELETING A MISDIALED DIGIT

[75] Inventor: Soo-Jin Jeoung, Incheon, Rep. of Korea

[73] Assignee: Daewoo Telecom, Ltd., Icheon, Rep. of Korea

[21] Appl. No.: 766,741

[22] Filed: Dec. 13, 1996

[30] Foreign Application Priority Data

Dec. 14, 1995 [KR] Rep. of Korea .................. 95-49792

[51] Int. Cl.[6] .................................................. H04M 3/42
[52] U.S. Cl. .................... 379/242; 379/201; 379/216; 379/219; 379/355
[58] Field of Search .................................. 379/216, 242, 379/201, 219, 220, 221, 188, 189, 283, 355, 356, 230, 229

[56] References Cited

U.S. PATENT DOCUMENTS

| | | | |
|---|---|---|---|
| 4,769,835 | 9/1988 | Hirth et al. | 379/216 |
| 4,800,582 | 1/1989 | D'Agosto, III et al. | 379/216 |
| 4,873,720 | 10/1989 | Son | 379/216 |
| 4,964,159 | 10/1990 | Son | 379/216 |
| 5,204,894 | 4/1993 | Darden | 379/216 |
| 5,241,589 | 8/1993 | Jefferson | 379/216 |
| 5,351,287 | 9/1994 | Bhattacharyya et al. | 379/189 |
| 5,422,945 | 6/1995 | Wyatt | 379/283 |
| 5,430,791 | 7/1995 | Feit et al. | 379/216 |
| 5,455,858 | 10/1995 | Lin | 379/216 |
| 5,463,681 | 10/1995 | Vaios et al. | 379/189 |
| 5,550,909 | 8/1996 | Chanda et al. | 379/220 |
| 5,588,049 | 12/1996 | Detering et al. | 379/355 |
| 5,590,189 | 12/1996 | Turnbull et al. | 379/355 |
| 5,655,014 | 8/1997 | Walsh et al. | 379/201 |
| 5,680,449 | 10/1997 | Terajima et al. | 379/355 |

*Primary Examiner*—Ahmad F. Matar
*Assistant Examiner*—Scott Wolinsky

[57] ABSTRACT

A call processing method and apparatus for erasing a digit stored in memory in response to a "delete" signal generated by a caller station is disclosed. A protocol is provided for a switching system to recognize the "delete" signal as a command to erase a last stored input digit. In a telephone system, a subscriber's telephone is equipped with a "DEL" key to facilitate the generation of the "delete" signal to erase the last digit (e.g., a misdialed digit) that the switching system received during the process of dialing a telephone number from the caller station.

7 Claims, 4 Drawing Sheets

CALL PROCESSING METHOD ADAPTED FOR DELETING A MISDIALED DIGIT

FIELD OF THE INVENTION

The present invention relates to an electronic switching system; and, more particularly, to a call processing method capable of erasing a digit, e.g., a transmitted telephone number, in response to a "delete" input at the switching system.

DESCRIPTION OF THE PRIOR ART

When a telephone subscriber lifts his telephone handset to call another subscriber, a switching system in a regional center(RC) or "end office" connected to the caller telephone starts a "call processing". Major functions of the call processing include detecting the caller's act of lifting the handset off the hook, generating and sending various signal tones, and establishing a communication path between the calling and the called telephones.

Such dialing numbers as telephone, facsimile, radio pager and cellular phone numbers are commonly comprised of a routing code identifying the RC connected to the called subscriber and a subscriber number identifiable by the RC. The routing code includes a country code, an area code and a RC code. For example, as for a telephone number 82-2-589-1234, 82-2-589 is a routing code and 1234 is a subscriber number, among which 82 is a country code, 2 is an area code, 589 is a RC code.

Referring to FIG. 1, there is shown a conventional call processing procedure. First, when a caller lifts his handset, the switching system detects an off-hook signal originated by the lifting at step 102, and upon detecting the off-hook signal, the switching system provides a dial tone to the caller telephone. In response to the dial tone, the caller dials a first digit of a dialing number. The first dialed digit is received at step 103 and stored in a stack at step 104. At step 105, the stored digit is checked whether it matches with a code in a database which stores data including country codes, area codes, and RC codes. If the digit does not match with any code in the code database at step 105, the switching system receives a second digit at step 103 and stores the digit in the stack at step 104 so that the process of matching the set of the first plus the second digits with any code in the code database can be performed at step 105. If the set of the first and the second digits does not match with any code in the database, the steps 103 to 105 are repeated until a set of stored digits matches with a code in the database. If a matching code which matches with the digit or digits in the stack is found at step 105, the switching system prepares a path to route the call to a central office, e.g., a toll center, tandem office or end office depending on the kind of the matching code, at step 106. Then, at step 107, another check is made as to whether the matching code is a RC code. In case it is a RC code, since the remaining digits to be received are only the elements of the subscriber number, the switching system receives an additional digit at step 108 and sends the additional digit to the destination RC at step 109. At step 110, it is determined as to whether a digit count of the digits forwarded to the destination RC satisfies the digit count requirement for a subscriber number, e.g., four. If the requirement is found to be satisfied, a communication path is established between the caller and the receiver at step 111; but if not, steps 108 to 110 are repeated until the digit count requirement is satisfied, wherein the digits corresponding to the elements of the subscriber number are sent to the destination RC instantaneously without being stored since the digits are used at the destination RC. If the matching code found is determined not to be a RC code at step 107, the stack is cleared at step 112 and the procedure is returned to step 103 since the procedure needs more digit(s) as the routing code.

The conventional call processing method described above, however, is not capable of canceling a received digit even when it is desired to do so because a wrong digit has been mistakenly dialed by the caller. As a result, the caller will have to redial the whole dialing number, causing a waste of time and inconvenience to the caller.

SUMMARY OF THE INVENTION

It is, therefore, a primary object of the present invention to provide a call processing method capable of erasing a received digit in response to a "delete" input for use in a switching system.

In accordance with the present invention, there is provided a call processing method for use in a switching system, comprising the steps of: (a) detecting an off-hook signal initiating a communication from a caller station, receiving digit(s) from the caller station and storing the received digit(s) in a memory; (b) comparing the stored digit(s) in the memory with pre-assigned codes to determine whether the stored digit(s) matches with one of the pre-assigned codes; (c) erasing a digit in the memory in response to a "delete" signal inputted from the caller station; (d) sending each received digit to a regional center connected to a receiver station; and (e) establishing a communication path between the caller and the receiver stations.

BRIEF DESCRIPTION OF THE DRAWINGS

The above and other objects and features of the present invention will become apparent from the following description of preferred embodiments given with reference to the accompanying drawings, in which.

DETAILED DESCRIPTION OF THE PREFERRED EMBODIMENT

Figure 1:
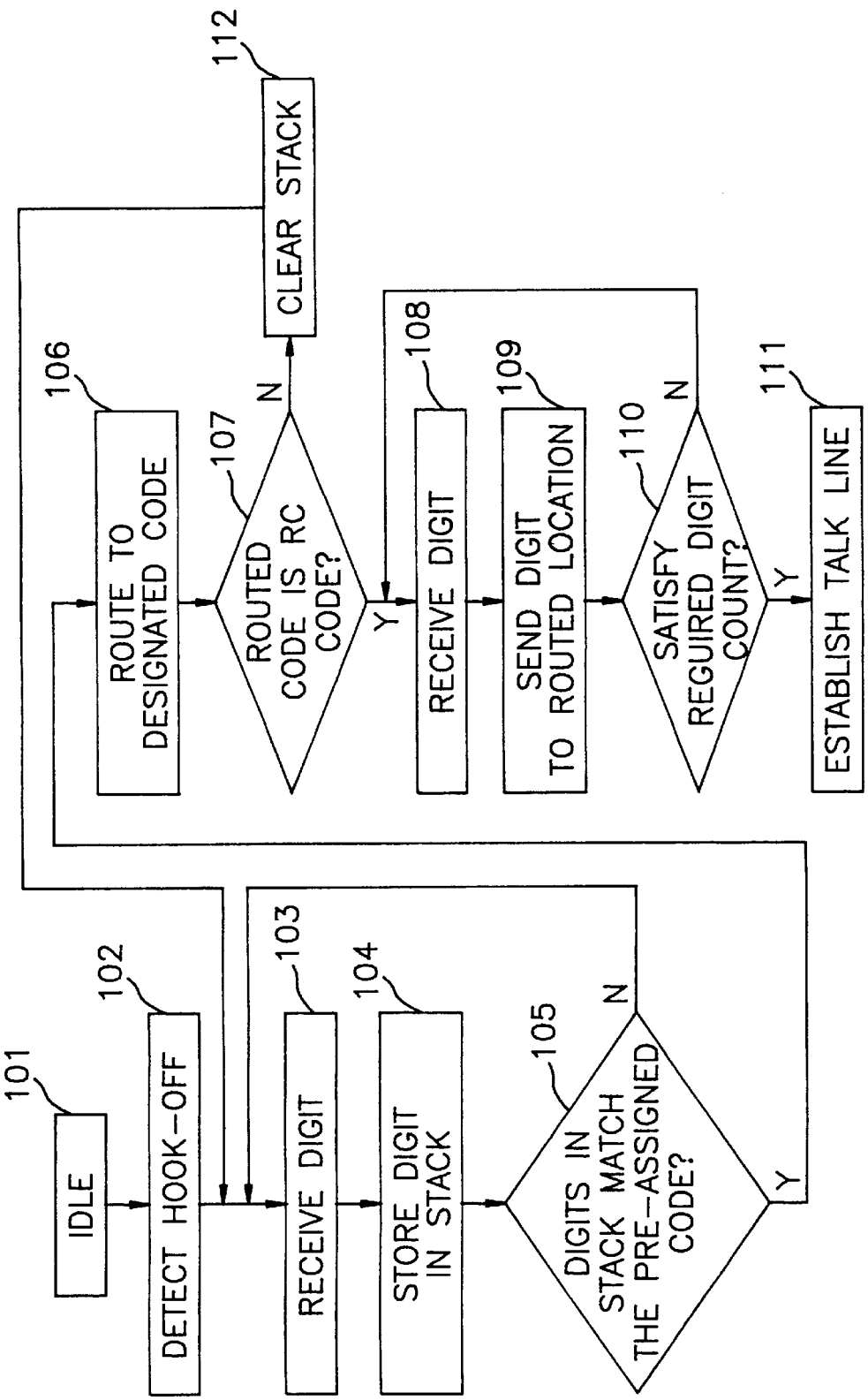
FIG. 1 illustrates a conventional call processing method.
Figure 2:
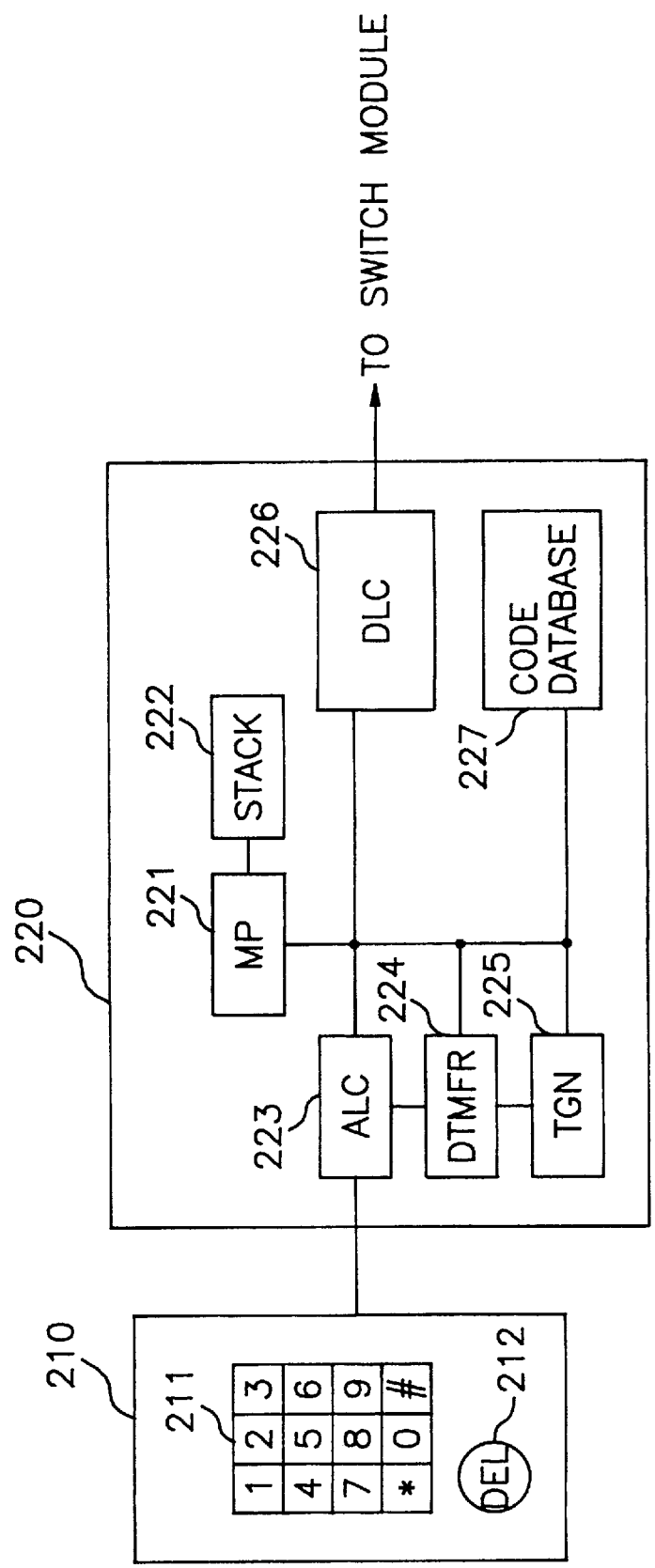
FIG. 2 presents a call processing apparatus for use in an electronic switching system in accordance with the present invention.

Referring to FIG. 2, there is provided a call processing apparatus in accordance with the present invention. A subscriber's telephone set 210 is equipped with a "DEL" key 212 thereon in addition to conventional 12 keys 211, i.e., 0 to 9, * and #. Furthermore, a protocol is provided for a switching system to recognize the "DEL" key as a signal for erasing a last stored input digit.

The call processing apparatus 220 comprises an analog line circuit(ALC) 223 for performing so-called "BORSCHT" functions, a dual tone multi-frequency receiver (DTMFR) 224 for interpreting a signal from the ALC 223, a tone generator(TGN) 225 providing a dial tone to a caller's telephone set 210 upon receiving an off-hook signal from the ALC 223, a digital line concentrator (DLC) 226 performing line connections to provide a communications path for various signal tones and providing a interpreted digits from the DTMFR 224 to a switch module(not shown), a code database 227 storing a set of country codes, area codes and regional center(RC) codes to be used for comparing with input digits stored in a stack 222, the stack 222 being an erasable memory temporarily storing inputted digits while they are compared with any code in the code database 227, and a main processor(MP) 221 for checking and comparing digits stored in the stack 222 with the codes stored in the code database 227 as well as controlling functions of the ALC, DTMFR, TGN, DLC, code database, and stack.

Figure 3A:
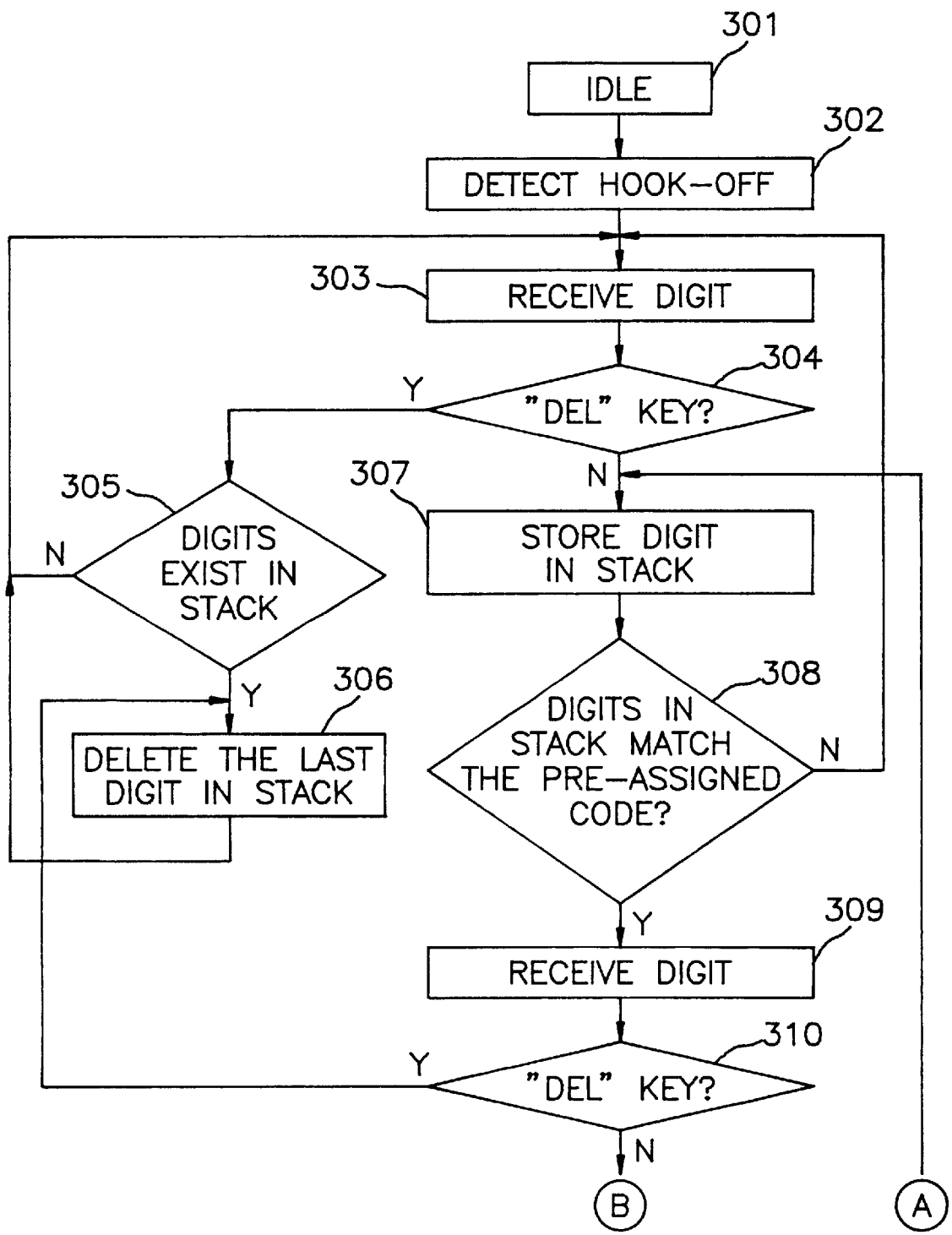
FIGS. 3A and 3B describe a call processing method in accordance with the present invention.
Figure 3B:
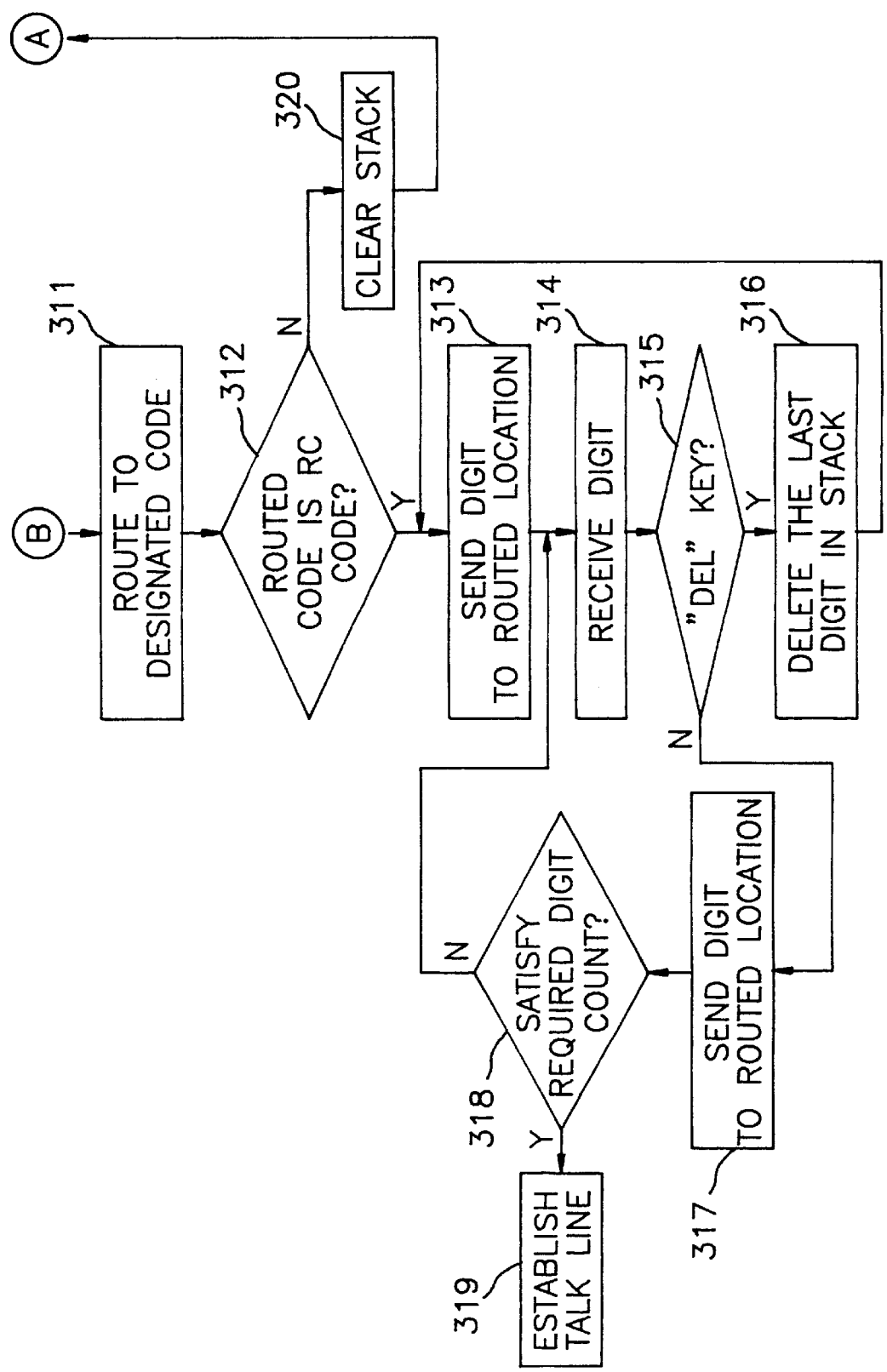

In FIGS. 3A and 3B in parallel with FIG. 2, there is illustrated a call processing method in accordance with the present invention.

When a telephone handset is lifted off its cradle, i.e., off-hooked, the switching system detects the off-hook at step 302 and provides a dial tone generated from the TGN 225 to the caller's telephone set 210. In response to the dial tone, the caller dials each digit of a dialing number, and the switching system receives the digit from the caller at step 303. Then, at step 304, the MP 221 checks whether the received digit is the "DEL" key. If it is the "DEL" key, the MP 221 determines at step 305 as to whether there exists any digit in the stack 222. If one or more digits exist in the stack, a last stored digit is removed from the stack at step 306 and the procedure goes back to step 303 to receive a next digit, and if otherwise, the procedure directly returns to step 303. If the first digit is not the "DEL" key at step 304, the digit is stored in the stack 222 at step 307. Then, the stored digit is checked whether it matches a code in the code database 227. If the stored digit does not match with any code in the code database 227, a second digit is received at step 303. If the second digit is the "DEL" key, steps 305 and 306 is performed, but if otherwise, the second digit is stored in the stack 222, and a set of the first and the second digits is determined whether it matches with a pre-assigned code in the code database 227 at step 308. If it is not determined to match with one in the code database 227, steps 303 to 308 are repeated.

Even if a set of digits stored in the stack 222 is determined to match with a code in the code database 227 at step 308, an additional digit is received at step 307. The additional digit received at step 309 is checked at step 310 whether or not it is the "DEL" key to make it sure the last stored digit is not a wrong digit. If it is the "DEL" key, the last stored digit is erased from the stack at step 306 and the procedure is returned to step 303, if otherwise, the digits stored in the stack 222 is used for routing, in other words, the switching system prepares a communication path to route the call to a central office, e.g., a toll center, tandem office or end office, at step 311. After the matched set of digits are used for the routing at step 311, the MP 221 checks at step 312 if the matched code used in the routing corresponds to a RC code. Unless the matched code is the RC code, the set of digits in the stack 222 is removed at step 320 since the set of digits in the stack are already used for routing, and at next step 307, the received digit at step 309 will be stored in the stack 222. If the matched code corresponds to a RC code at step 312, the digits remained to be received are only the elements of the subscriber number. The received digit at step 309 is sent to the RC of the routed location as a first digit in the subscriber number, and then a next digit is received and is stored in the stack at step 314. At step 315, the stored digit at step 314 is determined whether it is the "DEL" key, and if it is the "DEL" key, then the stored digit is removed at step 316 and the procedure goes to step 313 to receive another digit. If otherwise, the stored digit, which will be part of the subscriber number, is sent to the RC at the destination regional center. At step 318, a determination is made as to whether the number of sent digits satisfies a predetermined digit count, e.g., four. Unless the sent digit count meets the predetermined digit count requirement, a next digit is received at step 314. If the sent digit count is determined to satisfy a predetermined digit count requirement at step 318, the switching system establishes a communication path between the calling and the called telephone at step 319.

In the above description, however, even when more than one consecutive "DEL" key is inputted, the call processing procedure in accordance with the present invention is valid without any modification.

As is described in the above, the call processing method in accordance with the present invention enables the telephone operating company to provide a better quality service by adding one-digit-delete function to the conventional call processing method.

While the present invention has been described with respect to the preferred embodiments, other modifications and variations may be made without departing from the scope and spirit of the present invention as set forth in the following claims.

What is claimed is:

1. A call processing method for use in a switching system associated with a caller station equipped with a delete key, comprising the steps of:

(a) detecting an off-hook signal initiating a communication from the caller station, receiving digit(s) from the caller station and storing the digit(s) in a memory;

(b) comparing the stored digit(s) with pre-assigned codes to determine whether the stored digit(s) matches with one of the pre-assigned codes;

(c) erasing the last digit stored in the memory in response to a "delete" signal inputted from the caller station;

(d) sending digit(s) remaining in the memory to a regional center connected to a receiver station if another digit received after having compared the digit(s) at step (b) is not the "delete" signal; and (e) establishing a communication path between the caller station and the receiver station.

2. The call processing method of claim 1, wherein the caller station uses a telephone set having a "delete" key thereon.

3. A call processing method adapted for use in a switching system associated with a caller station equipped with a delete key arranged to output a delete signal, said method comprising the steps of:

(a) detecting an off-hook signal initiating a communication from the caller station;

(b) receiving a digit from the caller station;

(c) checking if the received digit at step (b) is a delete signal;

(d) storing the received digit at step (b) in a memory if the received digit is determined not to be the delete signal at step (c);

(e) erasing the last digit stored in the memory at step (d), and going to step (b), if the received digit at step (b) is determined to be the delete signal at step (c);

(f) comparing the stored digit(s) in the memory with pre-assigned codes to determine whether the stored digit(s) matches with one of the pre-assigned codes, the pre-assigned codes representing a country code, an area code and a regional center code;

(g) sending the stored digit(s) to a regional center connected to a receiver station if the stored digit(s) is determined to match with one of the pre-assigned codes at step (f);

(h) going to step (b) if the stored digit(s) is determined not to match with one of the pre-assigned codes at step (f); and (i) establishing a communication path between the caller station and the receiver station.

4. The call processing method of claim 3, wherein, after step (g), the method further comprising the steps of:

(j) checking if the stored digit(s) sent at step (g) matches with the regional center code;

(k) going to step (b) if the stored digit(s) sent at step (g) is determined not to match with the regional center code at step (j); and (l) repeating steps (b) to (e) and step (h) until a final digit is received, and going to step (i) if the stored digit(s) sent at step (g) is determined to match with the regional center code at step (j).

5. A method for connecting a caller station with a receiver station in an electronic switching system, said caller station being connected to a first regional center, said method comprising the steps of:

(a) providing the caller station with a plurality of keys including a delete key, each key arranged to create a signal representing a corresponding digit;

(b) receiving a signal from the caller station;

(b1) if the received signal corresponds to a digit other than the delete key, including said digit in a set of sequentially entered digits being stored at the first regional center;

(b2) if the received signal corresponds to the delete key, deleting a most recently included digit from said set, and then repeating step (b);

(c) comparing said set with a pre-assigned routing code to determine if there is a match, said pre-assigned routing code identifying a second regional center which is connected to said receiver station; and (d) if there is a match, receiving at least one subsequent signal from said caller station and transmitting said at least one subsequent signal to said second regional center to connect the caller station to the receiver station.

6. The method of claim 5, wherein the first and second regional centers are different from one another.

7. The method of claim 5, wherein in said step (d), a pre-determined number of subsequent signals collectively representing a subscriber number of the receiver station must be transmitted to said second regional center, before the caller station is connected to the receiver station.

* * * * *